July 1, 1930. R. H. STEVENS 1,769,866
FURNACE
Filed Sept. 22, 1921 2 Sheets-Sheet 2

WITNESS:
Rob R Kitchel.

INVENTOR
Richard H. Stevens
BY
Frank L Busser
ATTORNEY.

Patented July 1, 1930

1,769,866

UNITED STATES PATENT OFFICE

RICHARD H. STEVENS, OF MELROSE PARK, PENNSYLVANIA, ASSIGNOR, BY MESNE ASSIGNMENTS, TO OPEN HEARTH COMBUSTION COMPANY, A CORPORATION OF NEW JERSEY

FURNACE

Application filed September 22, 1921. Serial No. 502,454.

My invention relates to open hearth furnaces and more particularly to open hearth furnaces of the reversing type.

The object of my invention is to provide a furnace which will permit the fuel to be supplied in a novel manner to the end that the flame may be accurately regulated and maintained at a constant, without fluttering, and at the same time reducing the work of the gas producers to an extent to greatly prolong their life.

Further objects of my invention reside in details of construction and operation, which from the following description will be apparent.

Having now indicated in a general way the nature of my invention, I will proceed to describe in detail a preferred embodiment thereof with reference to the accompanying drawings, in which:—

The furnace shown is of the reversing type and is of identical construction at opposite ends, the ends serving alternately for the supply of fuel and the exhaust of the products of combustion.

$a$ indicates the hearth of the furnace, which may be of any usual or desired construction. $b$ indicates the roof which tips downwardly from points adjacent the ends of the hearth to the end wall of the furnace and $d$ indicates the sides. At opposite ends of the hearth are end walls $c$ at the center of each of which opens a gas and air port, preferably circular in shape and providing an opening from upwardly sloping gas and air passages $e$ into the furnace, while at the opposite sides of the furnace the end walls are apertured from the level of the end of the hearth to the roof to provide openings into passages $f$.

The gas and air passages $e$ extend into the front of gas chambers $g$ into the bottom of which open gas passages $h$ leading from checker chambers $q$. The passages $f$ are dead ended, but communicate with checker chambers $i$ through downtake passages $j$, opening into the bottom of the passages $f$ and adapted to be closed by valves $k$, the stems of which extend upwardly and are connected with suitable operating mechanism.

Hollow cooling tanks $l$, adapted to contain water, are built into the end walls of the furnace and extend above the roof and partly around the gas and air ports, and similar cooling tanks $m$ extending through the roof and having passages corresponding to the gas and air passages $e$ are positioned at the opening of the passages $e$ into the gas chambers $g$.

Venturi passages $n$, extending through cooling tanks $o$, open into the back of chambers $g$ and communicate with air chambers $p$, which in turn communicate with the checker chambers $i$ through the passages $j'$.

Between the tanks $l$ and $m$ arches $r$ are thrown over the passages $e$, and between tanks $m$ and $o$ arches $s$ are thrown over the gas chambers $g$, the arches keeping the tanks in place. If it be necessary to remove one of the tanks it may be readily done by merely breaking down one or the other of the arches, and it will be noted that tank $m$ is tilted out of the vertical to facilitate its removal.

Figure 1:
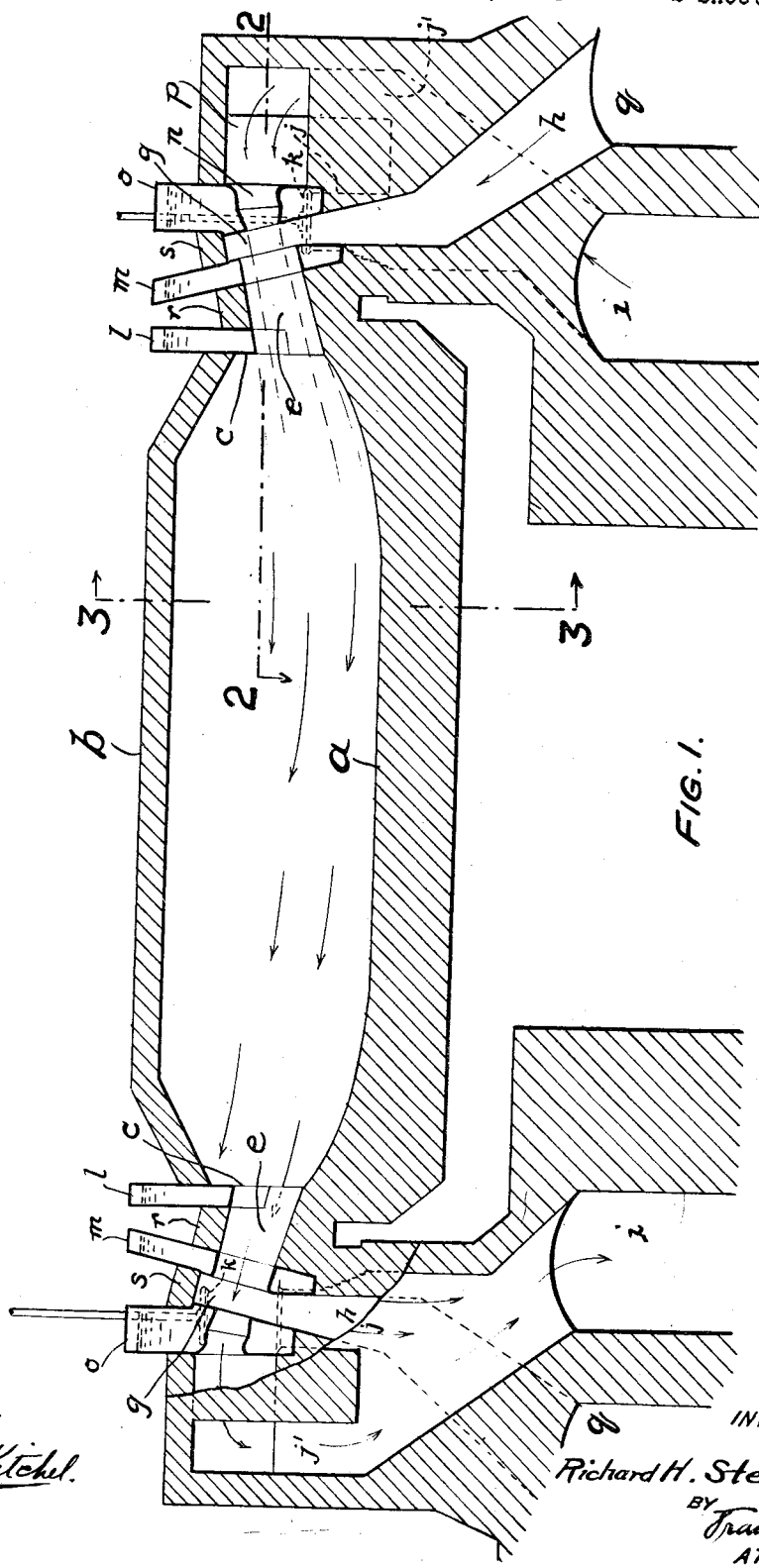
Fig. 1 is a longitudinal section, partly broken away, of a reversing furnace embodying my invention.
Figure 2:
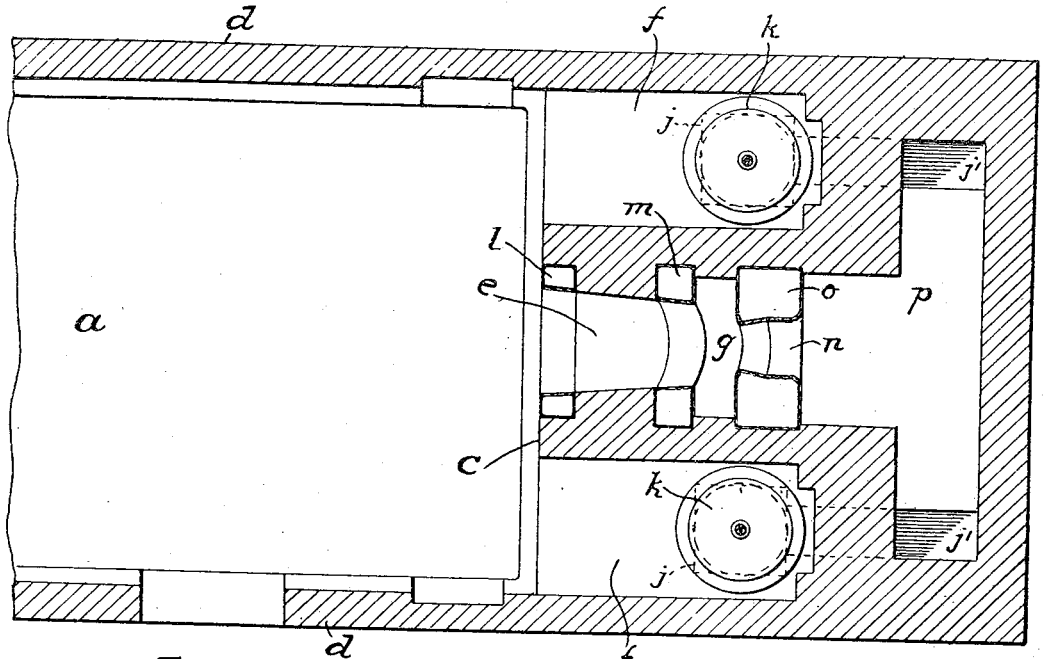
Fig. 2 is a sectional plan view of one end of the furnace shown in Figure 1, taken on line 2—2 Figure 1.
Figure 3:
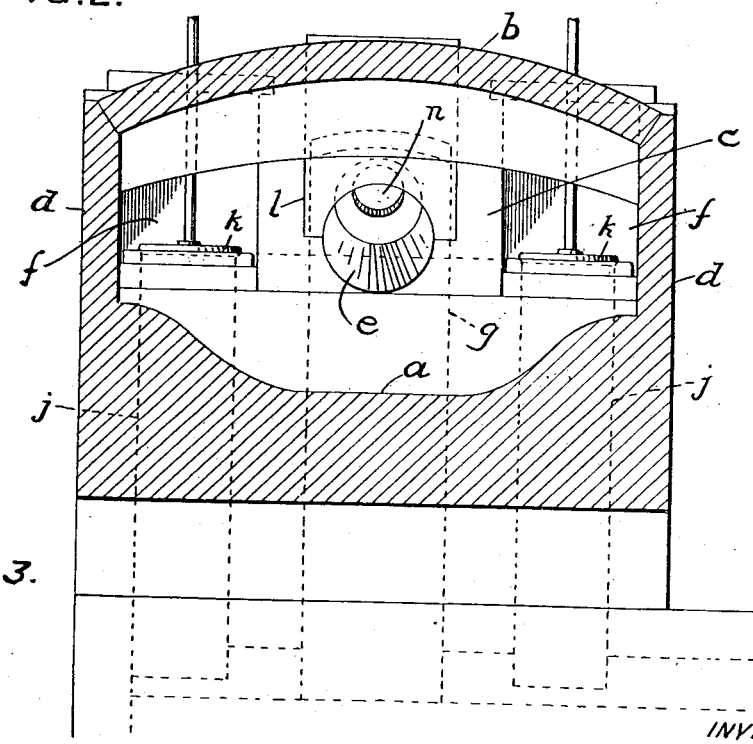
Fig. 3 is a cross-sectional view of the furnace shown in Figure 1, taken on line 3—3 Figure 1.

Referring now to Figure 1, it will be observed that the valve $k$ on the right hand end of the furnace is closed while the valve at the opposite end is open and with the valves in this position the furnace will operate from the right to the left as indicated by the arrows.

In practice, the gas from the producers at normal pressure is admitted to passage $h$ and fills chamber $g$. Air from the checker chamber $i$ is forced under pressure through passage $j'$ into the air chamber $p$, from which it passes through the Venturi passage $n$ by which its velocity is increased. From the venturi the air is directed through the gas chamber $g$ into the gas and air passage

*e.* The air in its passage through the chamber *g* has an aspirating effect on the gas, draws it into the stream of air, and carries it into passage *e*. In passage *e* the air and gas become mixed and the mixture is atomized into the furnace through the gas and air port. The fuel is ignited in the furnace and the pressure of the air is regulated so as to get the proper working of the furnace. Care, however, must be taken to regulate the pressure so as to get a velocity which will prevent propagation of the flame back into the combined gas and air port.

On the opposite or outlet end of the furnace the main portion of the products of combustion passes into the passages *f*, by the valves *k* and through the passages *j* into the checker chamber *i*, while a lesser part of the products of combustion passes through the gas and air port into passage *e*, the chamber *g* and through passage *h* to the checker chamber *q*. A small part of the products of combustion passes through the Venturi passage *n* and through the passage *j'* to the checker chamber *i*. The checker chambers *i* and *q* store heat absorbed from the products of combustion and when the furnace is reversed transmit it to the air and gas supplies, respectively.

It will be noted that in the furnace described the gas is aspirated by the air, due to the air being under pressure and projected at high velocity, so that the gas may be supplied at normal pressure with consequent relief to the producers.

It will also be noted that due to the inclination of the passages *e* the fuel is projected into the furnace in a direction tending to keep the flame away from the roof and down on the charge.

Finally it will be noted that the face of the end walls adjacent the gas and air ports, the opening of passage *e* into the chamber *g* and the Venturi passage, are protected from being cut away, by the hot products of combustion, by the cooling tanks *l*, *m* and *o*, respectively.

Having now fully described my invention, what I claim and desire to protect by Letters Patent is:

1. A furnace comprising a hearth, a gas conduit, a gas and air passage terminating at one end in a port in the end wall of the furnace and at the opposite end terminating in said gas conduit, an air conduit, a Venturi passage affording communication between said air conduit and said gas conduit, a plurality of cooling tanks positioned between said air conduit and said port in the end wall, and individual arches separating said tanks whereby on the removal of said arches said tanks may be removed without otherwise disturbing the furnace structure.

2. A water container serving as a water jacket for a blow torch port, the bottom of which container is shaped to form, and does form, a continuation of the port, said container projecting through the top section of the port, and seated on the masonry of the lower portion of the port, whereby the container may be lifted out of the port structure without the necessity of moving any of the contiguous parts of the port.

In testimony of which invention, I have hereunto set my hand, at Philadelphia, Pa., on this 17th day of September, 1921.

RICHARD H. STEVENS.